(12) United States Patent  
Lin et al.

(10) Patent No.: US 6,594,659 B1
(45) Date of Patent: Jul. 15, 2003

(54) METHOD FOR CREATING A TOLL-FREE NUMBER AUDIT TAPE

(75) Inventors: Sheng Ling Lin, Lisle, IL (US); Hongguang Li, Lisle, IL (US); Patrick Rabau, Willowbrook, IL (US); Chih-Pin Pai, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,354

(22) Filed: Nov. 29, 1999

(51) Int. Cl.⁷ .............................................. G06F 17/30
(52) U.S. Cl. ............................ 707/7; 711/4; 711/171; 711/111
(58) Field of Search ............................ 707/7, 204, 1, 707/100, 101, 205; 711/1, 4, 111, 161, 162, 170–173

(56) References Cited

U.S. PATENT DOCUMENTS

| | | | |
|---|---|---|---|
| 4,757,267 A | * 7/1988 | Riskin | 379/114.24 |
| 5,117,495 A | * 5/1992 | Liu | 707/7 |
| 5,425,079 A | * 6/1995 | Noda et al. | 360/32 |
| 5,517,632 A | * 5/1996 | Matsumoto et al. | 711/114 |
| 5,530,854 A | 6/1996 | Emery et al. | |
| 5,680,607 A | * 10/1997 | Brueckheimer | 707/3 |
| 5,815,559 A | * 9/1998 | Schnable | 379/114.01 |
| 6,091,810 A | * 7/2000 | Shaffer et al. | 379/211.02 |
| 6,163,597 A | * 12/2000 | Voit | 379/207.15 |
| 6,185,290 B1 | * 2/2001 | Shaffer et al. | 379/219 |

OTHER PUBLICATIONS

UDI Manber, Introduction to Algortithms A Creative Approach, 1989, Addison–Wesley Publishing Company, Inc. pp. 127–128.*

* cited by examiner

Primary Examiner—Jean R. Homere
Assistant Examiner—Leslie Wong

(57) ABSTRACT

A sorting method for use with a database having randomly hashed records stored therein. The records are sorted in accord with a predetermined parameter and the database exists on a storage medium. At least one stage of the method includes sorting the records in accord with a subgroup of the predetermined parameter and into record groups stored in the storage medium. Records are further sorted in later stages and may be read onto a second medium for sorting. The sorting method allows the amount of processor memory used for sorting to be limited, such that adverse effects on normal call processing are limited or nonexistent.

2 Claims, 6 Drawing Sheets

| 611 | 612 | 613 |
|---|---|---|
| TOLL-FREE NUMBER | TOLL-FREE RECORD UPDATE TIME | TOLL-FREE NUMBER OWNER IDENTIFIER |

METHOD FOR CREATING A TOLL-FREE NUMBER AUDIT TAPE

TECHNICAL FIELD

This invention relates to the field of telecommunications services. Specifically, this invention is to an improved method for creating an audit tape from a record database.

BACKGROUND OF THE INVENTION

A telecommunications system includes a complicated network of switches and modules in continual interaction with one another. Due to heavy service demands by a large number of telecommunications systems users, it is important that network trafficking be efficient and reliable.

Within a telecommunications system, components interact for call processing and for transferring information. For example, components may communicate with one another to request information needed to process a call, provide a service, or update a record. Components that operate or respond slowly or which fail may adversely affect call processing through other parts of the system and contribute to an overall increase in call processing traffic.

Telecommunications equipment includes storage media, such as a magnetic or optical disks, configured for storing information, including a toll-free number database. A toll-free number database is composed of a number of records. Typically, a toll-free record within a toll-free number database includes information specific to the corresponding toll-free number. A toll-free record may include information regarding such functions as call processing, on-line menus, call forwarding, messaging, and a variety of other applications. Thus, toll-free records vary not only in content but in size as well.

The organization of toll-free records within the toll-free database may vary from system to system. For example, some systems organize the toll-free number database by record size. In one such system, a plurality of memory locations are allocated within the storage medium. Each memory location corresponds to a predetermined range of record sizes. For storing and locating records within a memory location, each record may be treated as a fixed-size record of the largest size within the corresponding range of record sizes. Records may be identified by a subgroup of the record content, referred to as a record-key. For example, in a toll-free database, a record-key may consist of the toll-free number. Records may be located within storage locations through algorithms, such as a hashing algorithm, based upon the relative magnitude of the record-key. Records may also be stored in accordance with such algorithms. If a new record is assigned the space currently occupied by an existing record, a linked list may be utilized for storing the over-lapping information. Of course, a toll-free number database may be organized in any one of a number of other ways.

Occasionally, it is necessary to inventory the contents of a database within a telephonic system. Database records, however, are not necessarily stored in accordance with the organizational format that is preferred or required for inventory purposes. Referring to the example provided above, a regulatory authority in charge of the administration of toll-free number assignments presently requires that telecommunication service providers submit an audit tape of all toll-free numbers within the toll-free number service provider's database. The records must be organized in toll-free numerical order on the audit tape.

In prior art systems, the audit tape is created at the Service Control Point (SCP) by first sorting the records in the SCP processor memory (e.g., RAM). Due to the high number of possible toll-free records (64 million), the SCP must surrender a large amount of memory for sorting. The SCP also uses memory for call processing, its primary function. The prior art confirms that surrendering large amounts of memory for sorting toll-free records interferes with call processing.

Thus, there is recognized in the telecommunications field a need for an improved method for sorting a large number of database records.

SUMMARY OF THE INVENTION

The present invention is directed at a method of providing, from an unsorted database of variable sized records having a numerical-field, a database of records sorted in numerical-field order. Preferably, the sorted records include selected fields. The preferred method includes determining a fixed record size for the records in the sorted database and selecting a subset of the numerical-field as a basis for pre-sorting the records. The selecting step further comprises determining a maximum amount of processor memory to be used for pre-sorting. The records are pre-sorted into record groups and the record groups are written to a storage medium. Records within the pre-sorted record groups are sorted, providing a database of records sorted in complete numerical-field order. Because a maximum is set on the amount of processor memory used for sorting, effects on call processing can be controlled and minimized.

In a further embodiment of the invention, the method comprises providing a second storage medium having groups of memory storage locations allocated therein. Allocation of the groups of memory locations in the second storage medium is preferably based upon the selected subset of the numerical-field.

A still further embodiment of the invention includes writing subgroups of records from the groups of pre-sorted, fixed size records in processor memory to the second storage medium.

The unsorted database of variable sized records may comprise a toll-free number database, and the numerical-field may comprise toll-free number combinations. The pre-sorting step may be further defined by sorting the numerical-field in accord with less than six contiguous digits of the toll-free number.

In yet a further embodiment, each of the records in the sorted database consists of a toll-free number field, a toll-free record update time field, and a toll-free number owner identifier field. Preferably, each of the subgroups of records from the groups of pre-sorted, fixed size records consist of no more than 530 records and writing from the processor memory to the second memory device occurs no more frequently than approximately 9 times per second. The method may further comprise the step of writing to an audit tape the database of records sorted in complete numerical-field order.

BRIEF DESCRIPTION OF THE DRAWINGS

FIG. 6 illustrates the typical content of a variable sized record having a ten-digit numerical-field.

DETAILED DESCRIPTION OF THE PREFERRED EMBODIMENT

The preferred embodiment of the present invention will be described with reference to the telephone switching system 10 illustrated in FIG. 1. However, it is to be understood that the present invention is applicable to any telephonic switching system having a database of records.

Figure 1:
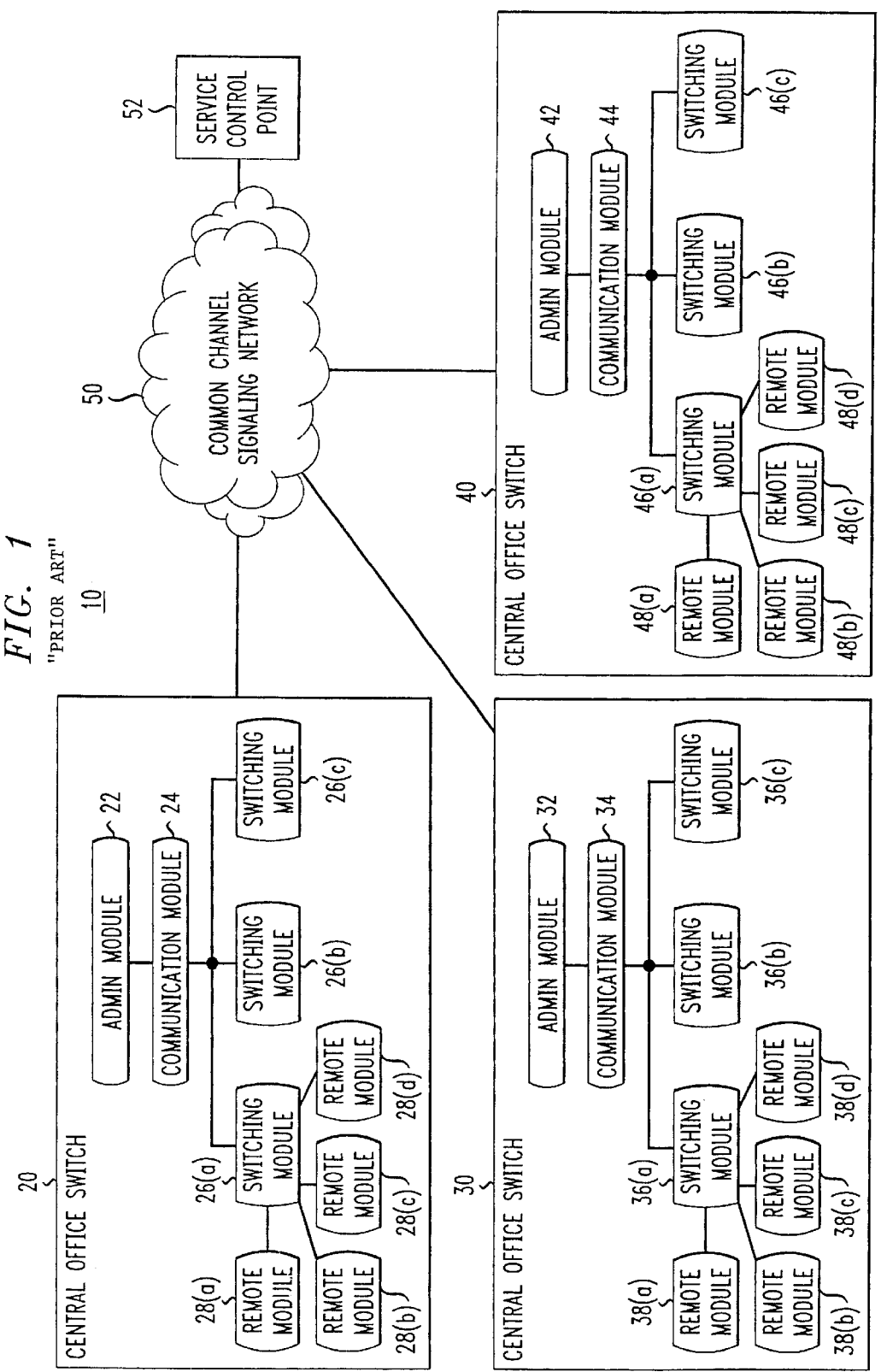
FIG. 1 is an illustration showing select components within a telecommunications switching network of the prior art.

The telephonic switching system 10 illustrated in FIG. 1 includes a plurality of central office switches 20, 30, and 40, in communication with a common channel signaling network 50. Network 50 is also in communication with service control point 52, explained in more detail below.

Each central office switch may include a number of components for phone switching and switching management for interconnecting communication channels and retrieving and storing data. For example, central office switch 20 includes an administration module 22, a communication module 24, and switching modules 26(*a*), 26(*b*), and 26(*c*). In the present example, the switching modules are connected to a plurality of remote modules. Illustratively, switching module 26(*a*) is in communication with remote modules 28(*a*), 28(*b*), 8(*c*), and 28(*d*).

Figure 2:
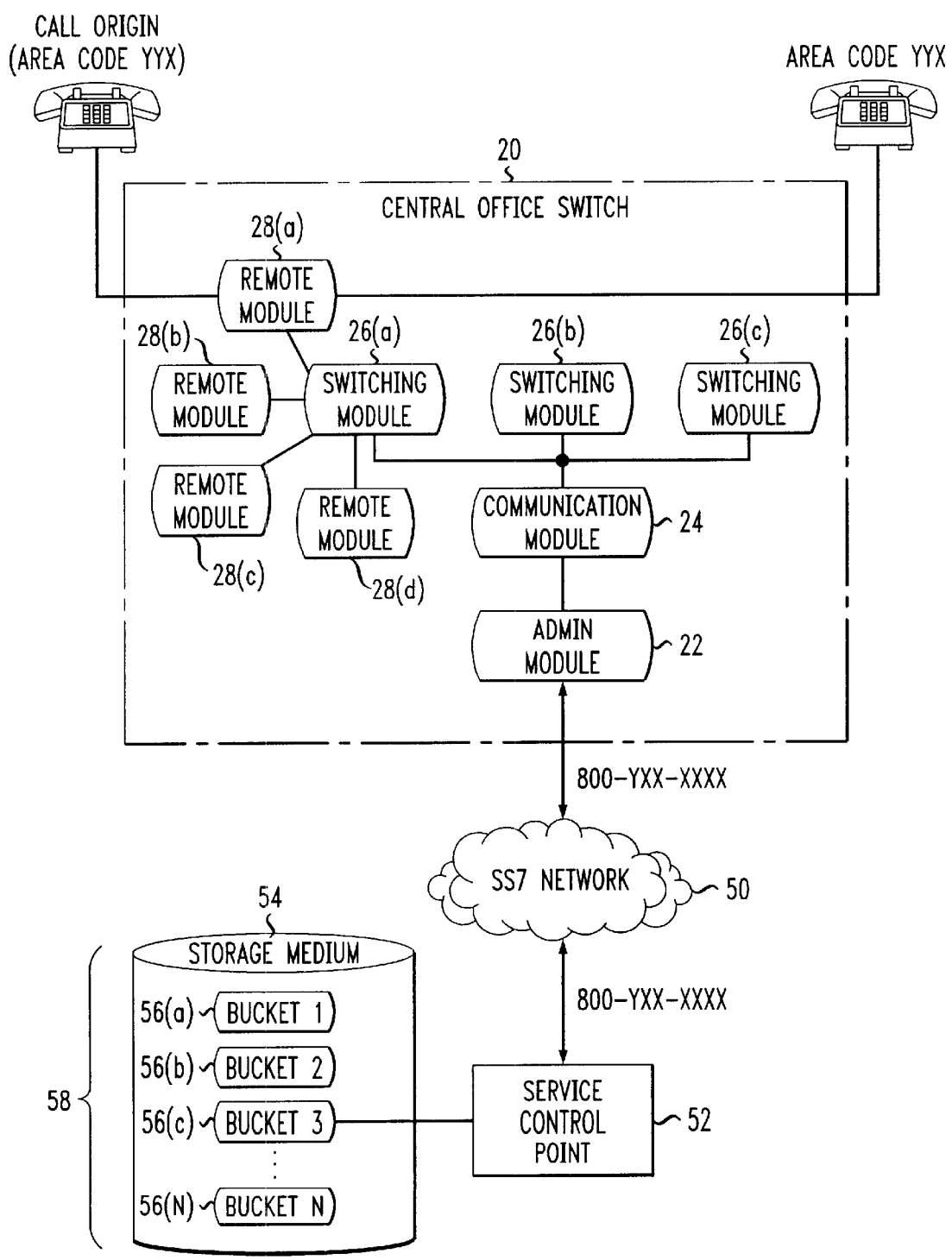
FIG. 2 is an illustration showing additional details of the telecommunications switching network shown in FIG. 1.

FIG. 2 is a further illustration of the telephone switching system 10 where, for exemplary purposes, the common channel signaling network 50 is an SS7 network and service control point 52 includes a storage medium 54. Storage medium 54 may be a disk or other device capable of storing data electronically. Storage medium 54 stores a database 58 organized into a number N of sections or groups, 56(*a*), 56(*b*), 56(*c*), . . . 56(N). Each section or group may be referred to as a bucket.

In the present example, database 58 is configured as a toll-free number database. The toll-free number database includes records that contain information pertaining to individual toll-free numbers. Typically, a toll free number record includes information for processing a toll-free call as requested by the toll-free number owner. Such processing may vary from a relatively simple routine to an extensive set of instructions. Thus, the range of record sizes in a toll-free database is typically broad.

In one example, the toll-free number record may simply instruct the system to forward the call to a long distance carrier for further processing. Thus, the record may be relatively small, such as less than 80 bytes. In another example, the toll-free number record may provide routing instructions t based upon the dialing number, date, day, or time of the call. Such a record may be large, requiring up to 220 kilobytes of memory in database 58.

While the toll-free database may be structured according to any one of a number of organizational schemes, it is known in the art that efficient use of disk space may be achieved by allocating space, i.e., buckets, in accord with record size. In such an organizational scheme, disk space is pre-allocated into sections, referred to as buckets, for holding a plurality of records. Preferably, a record size limitation is assigned to each bucket, thus defining an acceptable range of record sizes for each bucket. Such an organizational scheme allows records to be located efficiently, as discussed above. Of course, other organizational schemes are possible. The method of the present invention is not limited for use with only databases having an organizational scheme based upon record size.

Referring again to FIG. 2, for the present example it may be assumed that database 58 has 40 fixed-size buckets. Illustratively, toll-free records may be sorted into buckets within the database as follows:

| Bucket no. | Record size range (in bytes) |
|---|---|
| 1 | Up to 80 |
| 2 | 81 to 144 |
| 3 | 145 to 500 |
| . | . |
| . | . |
| . | . |
| 38 | 32,001 to 64k |
| 39 | 64,001 to 128k |
| 40 | 128,001 to 220k |

Each record is stored in the record group that holds records of corresponding size. For example, assuming the record size for toll free number 888-777-6666 is 280 bytes, the database will include a pointer to bucket three for that number. The record for 888-777-6666 will be in bucket three.

There are a large number of possible toll-free numbers. The following table represents all possible toll-free number combinations:

| | |
|---|---|
| 0 | 800 - $X_9X_8X_7$ - $X_6X_5X_4X_3$ |
| 1 | 888 - $X_9X_8X_7$ - $X_6X_5X_4X_3$ |
| 2 | 877 - $X_9X_8X_7$ - $X_6X_5X_4X_3$ |
| 3 | 866 - $X_9X_8X_7$ - $X_6X_5X_4X_3$ |
| 4 | 855 - $X_9X_8X_7$ - $X_6X_5X_4X_3$ |
| 5 | 844 - $X_9X_8X_7$ - $X_6X_5X_4X_3$ |
| 6 | 833 - $X_9X_8X_7$ - $X_6X_5X_4X_3$ |
| 7 | 822 - $X_9X_8X_7$ - $X_6X_5X_4X_3$; | where the second and third numbers must be identical, the first three digits cannot be "899" or "811," and $X_9$ cannot be a "0" or a "1". Thus, there are 64 million possible toll-free number combinations.

As explained above, there is occasionally a need to provide an audit tape of toll-free records. Currently, national standards require that the records on the audit tape be indexed by toll-free number in numerical order. However, toll-free numbers are assigned randomly and the records in the toll-free database are randomly hashed, i.e., are not sorted in numerical order. Thus, the records must be sorted in numerical order prior to writing to the audit tape.

Figure 3:
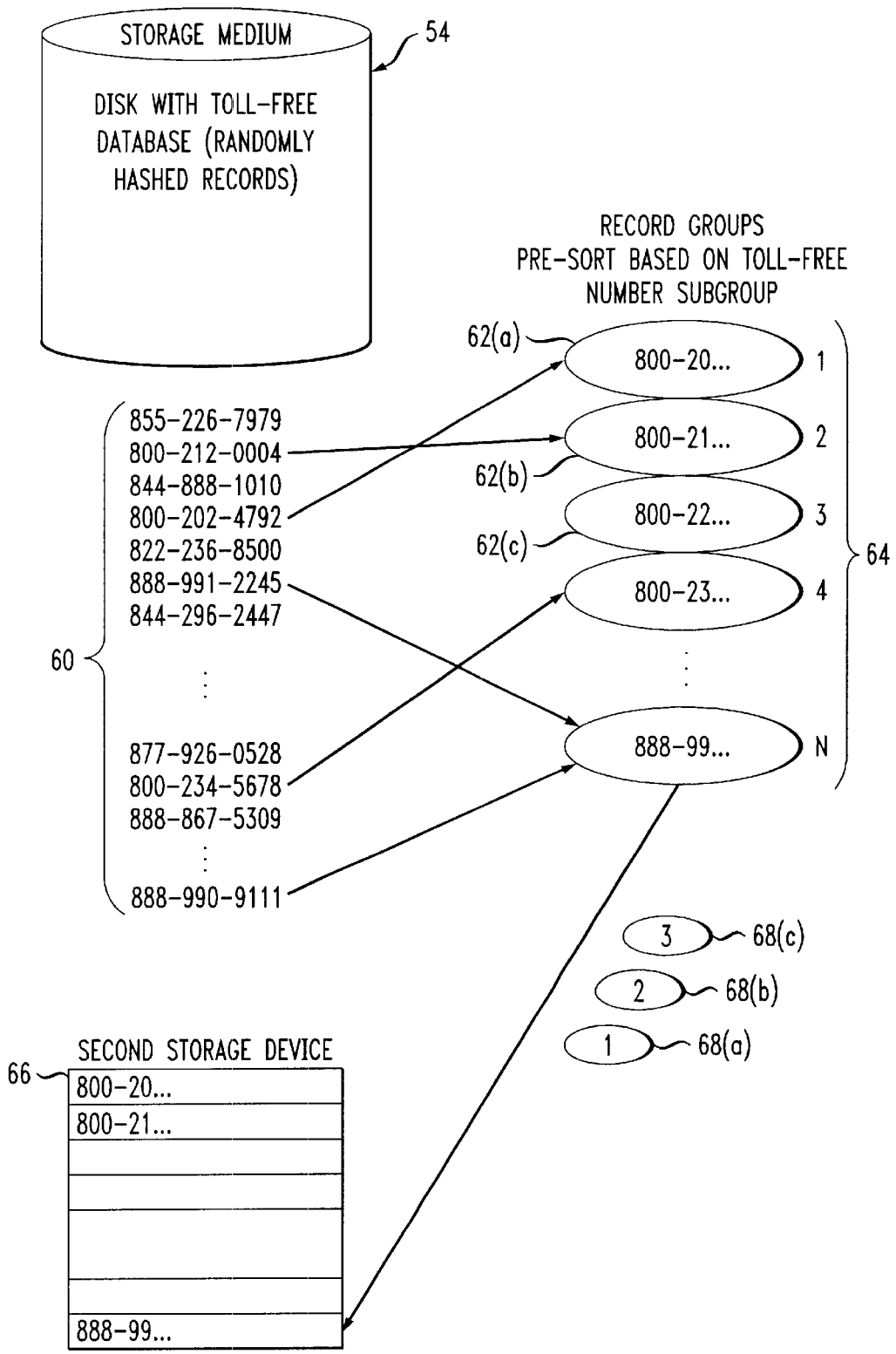
FIG. 3 is an illustration showing an overview of one embodiment of the method of the present invention for sorting a database of records.

Referring to FIG. 3, therein is shown a storage medium 54 having a plurality of randomly hashed records 60 stored therein. Storage medium 54 is accessed on a continual basis for retrieving toll-free records upon request from the SCP. As illustrated, the records are not stored in numerical order. The records must be sorted in numerical order prior to writing to the audit tape.

As described in detail below, the method of the present invention includes allocating space within processor memory for pre-sorting the records, reading the requested data for each record, temporarily copying the requested data for each record to a record group within the allocated space, transferring the records from each record group to a corresponding record group within a second storage medium, sorting the records in each record group, and consecutively writing each sorted record group to tape.

In the presently preferred embodiment, the records are sorted in complete numerical order in two stages. As will become apparent, the records may be sorted in complete numerical order in more than two stages.

The present embodiment employs a sorting algorithm that utilizes a predetermined, limited amount of processor memory for sorting. By limiting the amount of processor memory for sorting, the extent of adverse effects on call processing can be controlled. In the present embodiment, in the first sorting stage each record is copied from the database and pre-sorted to a group in processor memory. Pre-sorted groups may be written to storage medium 54 or, in an alternate embodiment, to a second storage device. The pre-sorted record groups are consecutively accessed and the records in each pre-sorted group are sorted in processor memory and written to tape, providing a list of records sorted in complete numerical order. In other embodiments, more than two sorting stages may be utilized.

In the first stage of the present embodiment, the records are sorted into a number N of record groups. Each record group corresponds to a toll-number numerical subgroup. A toll-number subgroup consists of less than all ten digits of the toll-free number. For example, a subgroup may consist of the first five numbers of the toll-free number. It is noted that sorting the records in the first (pre-sort) stage by the first five digits of the toll free number will yield 640 record groups (8×8×10) in this stage.

As discussed above, the amount of processor memory used for sorting may have a direct impact on whether the sorting process affects normal call processing. Thus, a definite amount of memory, referred to as M4S (memory for sorting), may be allocated for sorting.

In the present embodiment, the records are first distributed, based upon a subset of the criteria for sorting, to a plurality of groups allocated within M4S. A group does not have to be large enough to contain at one time all of the records from the database that belong to that group. As a group approaches capacity, the present contents of the group may be written to a storage medium. Preferably, a second storage medium is included for receiving the contents of each group. The storage medium has space allocated for each group and each group in the storage medium is large enough to store all of the records for that group.

Writing record groups from the processor memory to a second memory device requires SCP write cycles. Write cycles may affect call processing. To limit the effect on call processing due to write cycles, a variable for the permissible disk write frequency, or RTE, is designated. It may also be desirable to designate the duration of the period, PRD, over which sorting must occur. For example, it may be predetermined that for a four hour period, it is tolerable to allow 9 disk write cycles per second. Thus, RTE is 9/second and PRD is 4 hours.

In the present example, as illustrated in FIG. 6, it is not necessary to include the full record for each number on the audit tape. For example, presently the national organization that regulates the distribution of toll-free numbers requires that each record on the audit tape 601 include only the toll-free number 611, the identity of the owner 612, and the most recent date 613 that the record was updated. In this case, a predetermined number of bytes may be allocated for each record:

| Number of bytes | Field |
|---|---|
| X | number |
| Y | identity |
| Z | date |
| X + Y + Z | total |

In the above example, the first five digits corresponds to the identity of each record group. Thus, within each record group, a record may be identified by the last five digits of the toll-free number. In the binary system, a five digit number (base 10) may be adequately represented by 3 bytes.

The number of bytes used to identify the owner is selectable. In the presently preferred embodiment, the identity of the owner is adequately represented by 5 bytes. In the present embodiment, the number of bytes provided for representing the date field is 4. Thus, each record consists of a total of 12 bytes.

As explained above, pre-sorting is based upon a subgroup of digits of the toll free number. The number of subgroup digits determines the number of pre-sort record groups. The following table shows the number of pre-sort record groups required based upon the number of subgroup digits used for pre-sorting:

| Number of digits (starting from most-significant-digit) | Number of pre-sort record groups |
|---|---|
| 3 | 8 |
| 4 | 64 |
| 5 | 640 |
| 6 | 6400 |
| 7 | 64000 |

As can be ascertained from the above-table, as the number of digits increases, the number of pre-sort groups increases. As discussed above, M4S is predetermined. Thus, as the number of pre-sort record group increases the amount of pre-sort memory allocated for each group decreases. In the presently preferred embodiment, 4 megabytes of processor memory is allocated for pre-sorting. The following table shows the amount of memory allocated for each group for this example:

| Number of digits (starting from most-significant-digit) | Number of pre-sort record groups | Memory per record group |
|---|---|---|
| 3 | 8 | .5 Mbytes |
| 4 | 64 | 62.5 kbytes |
| 5 | 640 | 6.25 kbytes |
| 6 | 6400 | 625 bytes |
| 7 | 64000 | 62.5 bytes |

In the present embodiment, as records are written to each record group and the processor memory space allocated for a group reaches capacity, the records within the pre-sort group are written to a corresponding record group in a second memory device. Thus, the frequency of writing to the second memory device is dependent upon the amount of processor memory allocated for each record group, i.e., the number of records that can be stored in each record group before writing to the second memory device decreases as the processor memory space allocated for each record group decreases. Returning to the toll-free number database discussed above, there are 64 million possible toll-free number combinations, i.e., records. The following table shows, for the present embodiment, the relation between the amount of memory allocated per record group, the number of records that can be stored between write cycles, and the approximate total number of disk write cycles required.

| Memory per record group | Number of records/write cycle | Approx. No. disk writes |
| --- | --- | --- |
| .5 Mbytes | 41,600 | 1500 |
| 62.5 kbytes | 5,200 | 12,300 |
| 6.25 kbytes | 520 | 123,000 |
| 625 bytes | 52 | 1,230,000 |
| 62.5 bytes | 5 | 12,300,000 |

Referring to the above-two tables, it can be observed that pre-sorting in accord with fewer digits requires fewer disk write cycles, while sorting in accord with more digits requires more disk write cycles. Disk write cycles may affect (slow down) call processing. However, pre-sorting in accord with a small number of digits provides only a small number of pre-sorted groups with many records in each group. Having many records in each group may warrant additional pre-sort stages, as explained below. The relationship between the parameters discussed above may be expressed by the following formula:

$$N = \frac{M4S}{RSZ \cdot \left(\frac{TOT}{PRD \cdot RTE}\right)}$$

where

N=Number of record groups, and

M4S=Disk Space Available for Sorting

TOT=Max. Number of Records Possible

RSZ=Record Size

PRD=Planned Hours for Sorting Stage

RTE=Permissible Disk Write Frequency (per hour)

The above equation may be solved for any variable, depending upon the restrictions present within a given sorting system. For exemplary purposes, it may be assumed that M4S, TOT, RSZ, and RTE are assigned predetermined values. Thus, N or PRD may be selected and the equation solved for the other variable.

Following the above example, the variables may be assigned the following values:

M4S=4 Mbytes p1 TOT=64 M

RSZ=12 bytes

PRD=4 hours

RTE=32,400 (9 disk writes per second)

and N=675, which corresponds to the first five digits of the toll-free number, translating to 640 record groups. Referring to FIG. 3, 64 million randomly hashed records 60 are pre-sorted into 640 record groups 64. As each record group reaches capacity, the records therein are written to a corresponding record group in a second storage device 66. Each write cycle 68(*a*), 68(*b*), and 68(*c*) may be referred to as write-bucket. The approximate number of bytes per write-bucket may be expressed as WBB, where:

$$WBB = \frac{RSZ \cdot TOT}{PRD \cdot RTE}$$

In the example provided above, WBB=6,000 bytes (approx.). The approximate number of bucket-write cycles per group may be expressed as NBW, where:

$$NBW = \frac{RSZ \cdot \frac{TOT}{N}}{WBB}$$

In the example provided above, NBW=190 (approx.).

Thus, in the preferred embodiment records are pre-sorted to a plurality of record groups in a second storage device. Sorting is completed in the second storage device and the sorted database is then written to tape. In the preferred embodiment, record groups are sorted in numerical order. The records are written to an audit tape after each group is sorted.

Figure 4:
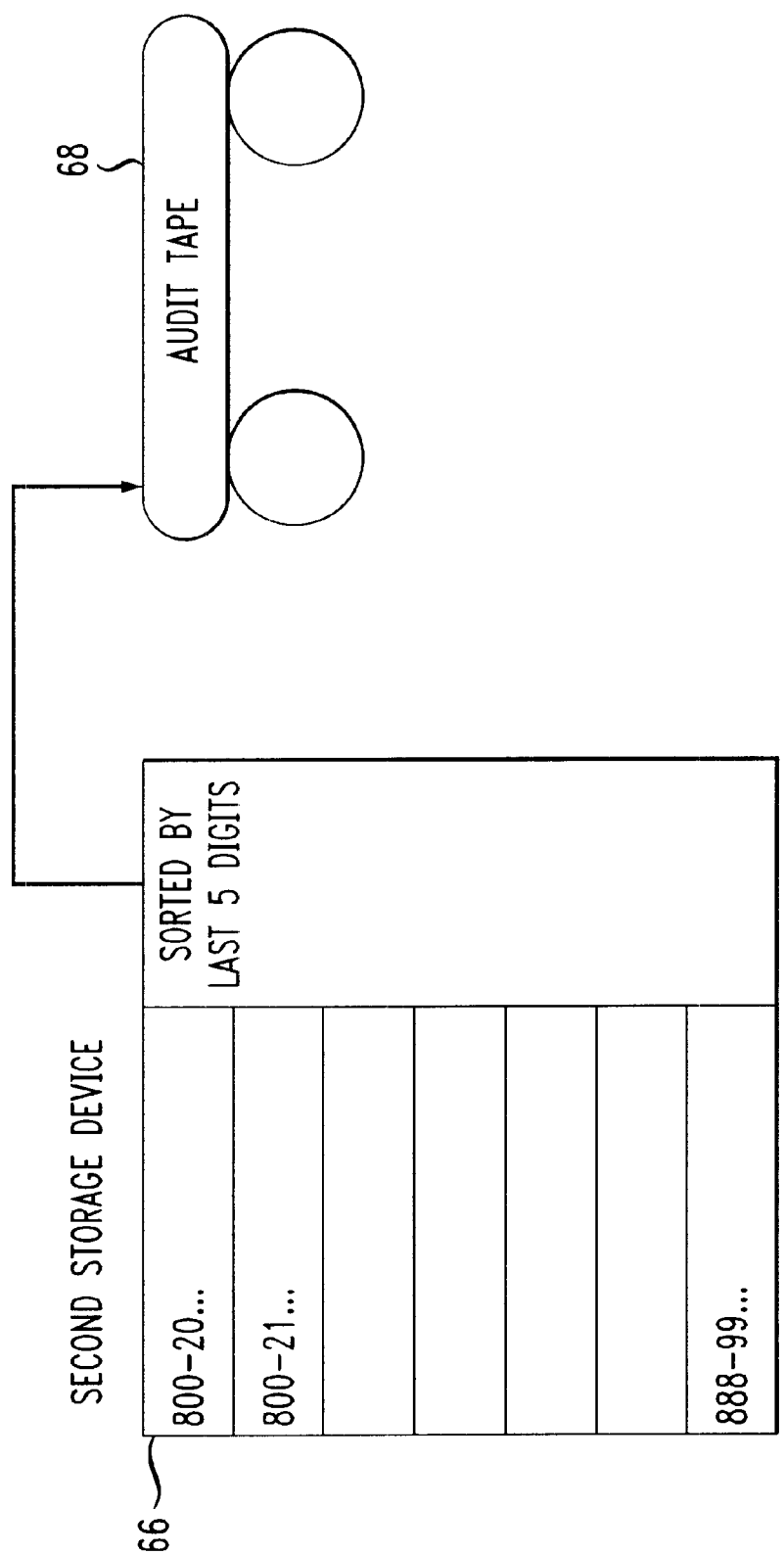
FIG. 4 is an illustration of further steps of the method illustrated in FIG. 3.

Referring to FIG. 4, the second storage device 66 includes a processor and memory for sorting the records in each record group. The second storage device processor may be the same processor that executed the pre-sorting stage or may be a separate processor. In the preferred embodiment, the records within the first record group are sorted by the SCP processor in accord with the last five digits of the toll free number. The first record group is then written to an audit tape 68. The records in the next record group are then sorted and written to tape. This process continues until all of the records in the last record group are sorted and written to tape.

Returning to the example provided above, there are 100,000 records in each record group in the second storage device. As discussed above, each record consists of 12 bytes. Therefore, the final stage requires only 1.2 megabytes of processor memory, which is well below M4S (4 megabytes).

In an alternate embodiment, the randomly hashed records are sorted in more than two stages. In this embodiment, the records are first sorted into a number of groups based upon a first subset of the numerical field. Then the records in each group are sorted into a plurality of subgroups. Further subgroups are created within subgroups and pre-sorting continues until the records are sorted in complete numerical order. The final stage of sorting may be identified when the memory required to sort all of the records within a pre-sort group is less than M4S. Each stage of sorting may be defined by the following equation:

$$N = \frac{M4S}{RSZ \cdot \left(\frac{TOT}{PRD \cdot RTE}\right)}$$

where

N=Number of record groups, and

M4S=Memory Space Available for Sorting

TOT=Max. Number of Records in Group

RSZ=Record Size

PRD=Planned Hours for Sorting Stage

RTE=Permissible Disk Write Frequency (per hour)

In each successive stage of pre-sorting, RSZ decreases, as the number of bytes needed to represent the remaining toll-free number digits decreases. As discussed above, the equation may be solved for any dependent variable. Whether a variable is independent or dependent may depend upon record data, characteristics of the storage medium, and restrictions present within a sorting stage.

The final stage of sorting occurs when:

$$(NDNB+DNDB) \cdot TOT \leq M4S,$$

where,

NDNB=Number of Bytes per Record Not Including the DN,

DNDB=Number of Bytes Needed to Represent the Remaining DN Digits, and

TOT=Number of Records in Group

In an alternate embodiment, records may be pre-sorted in multiple recursive stages within storage medium 54. Each stage may be defined by the number and placement of contiguous digits to be sorted. The final stage of pre-sorting may be designated as the stage in which, when completed, the remaining unsorted digits can be sorted within M4S and written to tape. Thus, an algorithm for sorting within storage medium 54 may have one or more pre-stages and a final sorting stage. For sorting records in accord with the toll-free number, the maximum number of contiguous digits sorted at each stage is dependent upon the amount of memory available for sorting, i.e., M4S. For example, an initial pre-sorting stage may sort toll-free database records in accordance with the first five digits, as follows:

| | |
|---|---|
| Initial Stage$_1$: | 800-20 |
| Initial Stage$_2$: | 800-21 |
| Initial Stage$_3$: | 800-22 |
| Initial Stage$_4$: | 800-23 |
| . | . |
| . | . |
| . | . |
| Initial Stage$_{638}$: | 888-97 |
| Initial Stage$_{639}$: | 888-98 |
| Initial Stage$_{640}$: | 888-99 |

The memory required for sorting the next stage is dependent upon the number of digits remaining in the designated (toll-free) number. In the above example, there are five digits that remain in the designated number. Therefore, there are 100,000 records in each initial stage. The number of bytes required for each initial stage is defined as:

$$BYTES = REM \cdot SRSZ$$

where

BYTES=memory required for sorting (in bytes)

REM=number of records represented by remaining digits

RSZ=record size

In the above example, REM=100,000 and RSZ=12. Therefore, BYTES=1.2 megabytes.

In the present embodiment, Initial Stage$_1$ may be followed by one or more pre-sorting stages, if necessary, and a final sorting stage. In the above example, M4S=4 megabytes. Because the unsorted records in Initial Stage$_1$ may be sorted within 1 megabyte, sorting may be completed in a final sorting stage without further pre-sorting stages. The records sorted in Initial Stage$_1$ may be read out of the processor memory and written to tape.

Figure 5:
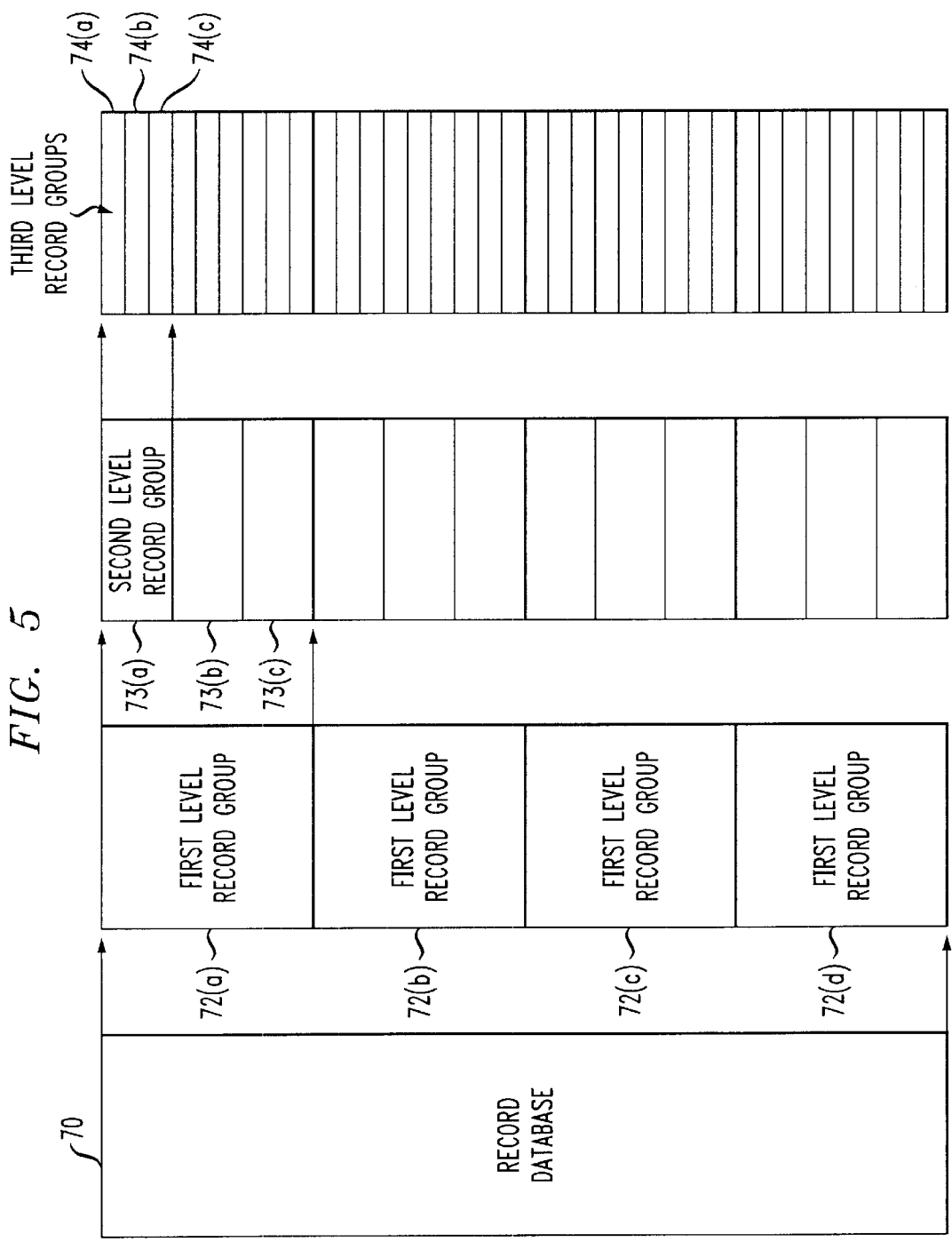
FIG. 5 is an illustration of an embodiment of the present invention in which record sorting is distributed over four stages.

FIG. 5 illustrates one alternate embodiment in which randomly hashed records are sorted in four stages. Multiple sorting stages may be required if there is a large number of records and/or record sizes are large. In this embodiment, a database of randomly hashed records 70 are first sorted into four record groups 72(a), 72(b), 72(c), and 72(d). Next, each record group is sorted into further record groups. In the example shown, record group 72(a) is sorted into record groups 73(a), 73(b), and 73(c). In the next step, each record group is sorted into further record groups. In the example shown, record group 73(a) is further sorted into record groups 74(a), 74(b), and 74(c). In the next step, the records in each record group are sorted in numerical order. Upon completion of sorting all of the records in the final record group, all of the records are sorted in complete numerical order.

Similar to the two-stage embodiment, subgroups of record groups may be transferred to a second storage medium.

Thus, the present invention provides a proficient method for sorting randomly hashed records. The method can minimize adverse effects on call processing, as seen in the prior art. The method is particularly useful for providing a pre-sorted database from randomly hashed records without effecting the quality of call processing.

It is to be understood that the above-described embodiments are merely illustrative of the principle of the invention and that many variations may be devised by those skilled in the art without in departing for the scope of the invention. It is, therefore, intended that such variations be included within the scope of the claims.

We claim:

1. A method of providing, from an unsorted database of variable sized records that comprise a toll-free number database, each of said variable sized records having a ten-digit numerical-field comprising: a toll-free number, a toll-free record update time, and a toll-free number owner identifier, a sorted database of records sorted In numerical-field order, wherein the record size of each record In the sorted database is fixed and the unsorted database resides in a first storage medium, said method comprising:

determined a fixed record size for the records in the sorted database;

selecting a subset of the numerical-field as a basis for pre-sorting the records;

selecting a fixed amount of processor memory for pre-sorting;

pre-sorting, within said fixed amount of processor memory, said unsorted database of variable sized records into groups of pre-sorted, fixed size records, consisting of no more than 1000 records, including sorting the records in accord with less than the first six continuous digits of the toll-free number;

providing a second storage medium having memory groups that correspond to the selected subset of the numerical-field allocated therein, sorting in numerical-field order the fixed-size records in each of said pre-sorted groups; and writing subgroups of records from each of said groups of pre-sorted, fixed size records from said processor memory to the corresponding groups of memory in said second storage medium, said writing step further defined by writing no more than approximately 9 times per second from said processor memory to said second storage medium.

2. The method of claim 1 further comprising the step of writing said database of records sorted in complete numerical-field order to an audit tape.

* * * * *